United States Patent
Everett et al.

(10) Patent No.: US 7,287,586 B2
(45) Date of Patent: Oct. 30, 2007

(54) COMPOSITIONS AND METHODS FOR PLUGGING AND SEALING A SUBTERRANEAN FORMATION

(75) Inventors: Don M. Everett, Houston, TX (US); Larry S. Eoff, Duncan, OK (US); Eldon D. Dalrymple, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 229 days.

(21) Appl. No.: 11/048,583

(22) Filed: Feb. 1, 2005

(65) Prior Publication Data

US 2006/0169455 A1   Aug. 3, 2006

(51) Int. Cl.
*E21B 33/138* (2006.01)
*E21B 43/20* (2006.01)
*E21B 43/22* (2006.01)

(52) U.S. Cl. .................. 166/270; 166/295; 166/300; 166/400; 507/212; 507/215; 507/224; 507/225; 507/903

(58) Field of Classification Search ................ 166/270, 166/294, 295, 300, 400; 507/212, 215, 224, 507/225, 903
See application file for complete search history.

(56) References Cited

U.S. PATENT DOCUMENTS

| | | | | |
|---|---|---|---|---|
| 4,172,066 A * | 10/1979 | Zweigle et al. | ............ | 523/223 |
| 4,282,928 A * | 8/1981 | McDonald et al. | ......... | 166/268 |
| 4,600,057 A | 7/1986 | Borchardt | ................... | 166/295 |
| 4,640,361 A | 2/1987 | Smith et al. | ................ | 166/288 |
| 4,836,940 A * | 6/1989 | Alexander | .................. | 507/119 |
| 5,168,928 A | 12/1992 | Terry et al. | ................. | 166/292 |
| 5,320,171 A | 6/1994 | Laramay | ...................... | 166/285 |
| 5,335,726 A | 8/1994 | Rodrigues | .................... | 166/295 |
| 5,358,051 A | 10/1994 | Rodrigues | .................... | 166/295 |
| 5,486,312 A | 1/1996 | Sandiford et al. | ........ | 252/315.1 |
| 5,663,123 A * | 9/1997 | Goodhue et al. | ........... | 507/225 |
| 5,836,392 A | 11/1998 | Urlwin-Smith | ............ | 166/295 |
| 6,187,839 B1 | 2/2001 | Eoff et al. | ................... | 523/130 |
| 6,192,986 B1 | 2/2001 | Urlwin-Smith | ............ | 166/295 |
| 6,476,169 B1 | 11/2002 | Eoff | ........................ | 526/307.2 |
| 6,581,701 B2 * | 6/2003 | Heying | ........................ | 175/72 |
| 6,777,377 B2 | 8/2004 | Myers | ........................ | 507/120 |
| 7,066,285 B2 * | 6/2006 | Shaarpour | ..................... | 175/72 |
| 7,163,969 B2 * | 1/2007 | Ahmed et al. | .............. | 523/130 |
| 2002/0040812 A1 * | 4/2002 | Heying | ........................ | 175/72 |
| 2004/0048751 A1 | 3/2004 | Dao et al. | .................... | 507/200 |
| 2004/0168798 A1 | 9/2004 | Creel et al. | ................. | 166/270 |
| 2004/0168802 A1 | 9/2004 | Creel et al. | ................. | 166/293 |
| 2004/0168804 A1 | 9/2004 | Reddy et al. | ................ | 166/295 |

OTHER PUBLICATIONS

PCT Search Report and Written Opinion (PCT/GB2006/000199).

* cited by examiner

*Primary Examiner*—George Suchfield
(74) *Attorney, Agent, or Firm*—Robert A. Kent; Baker Botts

(57) ABSTRACT

The invention provides for a composition for treating a subterranean formation, the composition comprising a water-swellable agent and a sealing agent. Preferably, the water-swellable agent: i) absorbs greater than 100 weight % of water; and ii) swells to greater than 100 weight % as it absorbs water. Preferably the sealing agent: i) is greater than 0.01 weight % soluble in water; and ii) forms a three dimensional gel structure in water. The invention also provides for a method of treating a subterranean formation penetrated by a wellbore, the method comprising the steps of: a) introducing a sealing agent into the subterranean formation; and b) introducing a water-swellable agent into the subterranean formation.

13 Claims, No Drawings

US 7,287,586 B2

COMPOSITIONS AND METHODS FOR PLUGGING AND SEALING A SUBTERRANEAN FORMATION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The invention generally relates to compositions and to methods for treating a subterranean formation. More specifically, the invention relates to compositions and methods useful for plugging and sealing the fluid flow through a zone of a subterranean formation. The fluids and methods are particularly useful in hydrocarbon wells and production methods.

BACKGROUND OF THE INVENTION

There has been a continuing and long-felt need for improving the oil/water ratio during hydrocarbon production by using chemical gel systems to resist the flow of injected or natural aqueous drive fluid through high permeability channels and fractures. This is sometimes referred to in the art as "conformance control." The general approach has been to inject a mixture of reagents, initially low in viscosity, into a zone of the formation that has high permeability. After a sufficient time to allow the mixture to be pumped into the subterranean formation or when exposed to the elevated temperature of the formation, the mixture of reagents then forms a gel to block the flow of water. Several mixtures of reagents have been used in this way.

For example, U.S. Pat. No. 4,600,057 entitled "Method of Reducing the Permeability of a Subterranean Formation" issued Jul. 15, 1986, and having named inventor John K. Borchardt, discloses a method of reducing the permeability of a subterranean formation comprising contacting the formation with an aqueous polymerizable composition comprising a polymerization monomer, a polymerization catalyst having a latent period, and an alcoholic compound selected from the group consisting of a cyclic ether containing a hydroxymethylene substituent on a carbon atom bonded to the ether oxygen, an aliphatic alcohol having a carbon-to-carbon double bond or a carbon-to-carbon triple bond, and mixtures thereof. See Abstract. U.S. Pat. No. 4,600,057 is incorporated herein by reference in its entirety.

U.S. Pat. No. 4,640,361 entitled "Thermally Responsive Aqueous Silicate Mixtures and Use Thereof" issued Feb. 3, 1987, and having named inventors William H. Smith and Edward F. Vinson, discloses a thermally responsive aqueous silicate composition consisting essentially of an aqueous solution containing an alkali metal silicate and a thermally responsive silicate gelation activator. The thermally responsive silicate gelation activator is a reducing sugar selected from the group consisting of lactose, dextrose, fructose, galactose, mannose, maltose, xylose and mixtures thereof. The aqueous silicate composition can be utilized in treating a subterranean formation for the purpose of sealing the formation. See Abstract; U.S. Pat. No. 4,640,361 is incorporated herein by reference in its entirety.

U.S. Pat. No. 5,168,928 entitled "Preparation and Use of Gelable Silicate Solutions in Oil Field Applications" issued Dec. 8, 1992, and having named inventors Dralen T. Terry and Edward F. Vinson, discloses a gelable silicate solution prepared by mixing fumed silica and an alkali metal hydroxide with water. The silicate solution is used to form a seal or plug in one or more subterranean formations or in a well bore penetrating the formations by pumping the solution into a desired location in the well bore or formations and allowing the silicate solution to gel therein. See Abstract. U.S. Pat. No. 5,168,928 is incorporated herein by reference in its entirety.

U.S. Pat. No. 5,320,171 entitled "Method of Preventing Gas Coning and Fingering in a High Temperature Hydrocarbon Bearing Formation" issued Jun. 14, 1994, and having named inventor Mary A. H. Laramay, discloses a method of preventing gas coning or fingering from a gas cap in an oil producing well. A silicate solution and a delayed activator are injected into the gas cap under conditions such that the activator causes the silicate to gel after a predetermined period of time to form a substantially impermeable zone or layer above the oil bearing formation to prevent gas from flowing into the oil well during production. See Abstract. U.S. Pat. No. 5,320,171 is incorporated herein by reference in its entirety.

U.S. Pat. No. 5,335,726 entitled "Water Control" issued Aug. 9, 1994, and having named inventor Klein A. Rodrigues, discloses a method of forming a gel in a subsurface formation whereby a monomer is polymerized in the formation in the presence of a crosslinker by an initiator selected from azo compounds which are temperature activated over a range of temperatures. The method is particularly useful to substantially terminate or at least decrease the flow of water from a subterranean formation into a wellbore penetrating the formation. See Abstract. U.S. Pat. No. 5,335,726 is incorporated herein by reference in its entirety.

U.S. Pat. No. 5,358,051 entitled "Method of Water Control with Hydroxy Unsaturated Carbonyls" issued Oct. 25, 1994, and having named inventor Klein A. Rodrigues, discloses a method of forming a gel in the subsurface formation whereby a self crosslinking monomer selected from hydroxy unsaturated carbonyl compounds is polymerized in the formation by a suitable initiator. In a preferred embodiment, the initiator is selected from azo compounds which are temperature activated over a range of temperatures. The method is particularly useful to substantially terminate or at least decrease the flow of water from a subterranean formation into a wellbore penetrating the formation. See Abstract. U.S. Pat. No. 5,358,051 is incorporated herein by reference in its entirety. Without being limited by theory, it is now believed that the monomer is not self-crosslinking, rather, it is the difunctional monomeric by-product that causes the crosslinking.

U.S. Pat. No. 5,836,392 entitled "Oil And Gas Field Chemicals" issued Nov. 17, 1998, and having named inventor Phillip Lance Urlwin-Smith, discloses a method for conformance control of a reservoir comprising injecting into a zone of the reservoir an aqueous solution of a co-polymer comprising at least one ethylenically unsaturated polar monomer and at least one copolymerizable ethylenically unsaturated ester formed from a hydroxy compound of the formula ROH wherein R is a selected alkyl group, alkenyl group, cycloalkyl group, aryl group or such groups substituted with from 1 to 3 hydroxy, ether or thio ether groups or a heterocyclic or selected heterocyclic alkylene group and at least one heteroatom selected from oxygen, nitrogen and sulfur and a selected alkenoic or aralkenoic carboxylic acid or sulfonic or phosphoric acid together with a crosslinking agent comprising a multi-valent metal ion capable of crosslinking an acrylic acid polymer to form a viscous gel. The injected fluid is flowed through at least a portion of a high permeability region within said zone wherein it is heated to an elevated temperature whereupon crosslinking of the polymers occurs to form a substantially non-flowable gel within said high permeability region. The crosslinking of the injected fluid to form the non-flowable gel within the formation reduces the permeability of said region in said zone. See Abstract. U.S. Pat. No. 5,836,392 is incorporated herein by reference in its entirety.

U.S. Pat. No. 6,187,839 entitled "Methods of Sealing Compositions and Methods" issued Feb. 13, 2001, and having named inventors Larry Eoff and David Brown, provides methods of sealing subterranean zones using high density sealing compositions. The methods are basically comprised of introducing a sealing composition into the subterranean zone comprised of a high density aqueous salt solution, a polymerizable monomer and a polymerizable initiator and allowing said sealing composition to form a sealing gel in said zone. See Abstract. U.S. Pat. No. 6,187,839 is incorporated herein by reference in its entirety.

U.S. Pat. No. 6,192,986 entitled "Blocking Composition For Use In Subterranean Formation," issued Feb. 27, 2001, and having named inventor Phillip Lance Urlwin-Smith, discloses a polymer composition for pumping downhole to gel in a subterranean formation comprising a water-soluble copolymer of (i) at least one non-acidic ethylenically unsaturated polar monomer and (ii) at least one copolymerisable ethylenically unsaturated ester; and an organic gelling agent therefor. See Abstract. U.S. Pat. No. 6,192,986 is incorporated herein by reference in its entirety.

U.S. patent application Ser. No. 10/826,615, entitled "Well Treatment Fluid and Methods for Blocking Permeability of a Subterranean Zone," filed Apr. 16, 2004, by the assignee of the present invention, discloses a well treatment fluid for use in a well, the well treatment fluid comprising water, a water-soluble polymer comprising at least one unit of vinyl amine, and an organic compound that is crosslinked with the polymer. It also discloses a method of treating a subterranean formation penetrated by a wellbore, the method comprising the steps of: (a) forming a treatment fluid comprising water, a water-soluble polymer comprising at least one unit of vinyl amine, and an organic compound that is crosslinked with the polymer; and (b) introducing the treatment fluid through the wellbore and into contact with the formation. See Abstract. U.S. patent application Ser. No. 10/826,615 is herein incorporated by reference in its entirety.

The above compositions, however, often experience such a long delay in developing high viscosity that the composition are excessively diluted and displaced more deeply into the formation than desired. Consequently, the compositions may pass completely through highly permeable fractures, vugs and the like, instead of blocking them.

SUMMARY OF THE INVENTION

The invention provides for a composition for treating a subterranean formation, the composition comprising a water-swellable agent and a sealing agent. Preferably, the water-swellable agent: i) absorbs greater than 100 weight % of water; and ii) swells to greater than 100 weight % as it absorbs water. Preferably the sealing agent: i) is greater than 0.01 weight % soluble in water; and ii) forms a three dimensional gel structure in water.

The invention also provides for a method of treating a subterranean formation penetrated by a wellbore, the method comprising the steps of: a) introducing a sealing agent into the subterranean formation; and b) introducing a water-swellable agent into the subterranean formation. These steps can be performed simultaneously or separately.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF THE PREFERRED EMBODIMENTS

In addition to the prior art discussed in the Background of the Invention, another method for controlling the production of natural and injection fluid in subterranean formations includes the use of water-swellable polymers. For example, water-swellable polymers are disclosed in U.S. patent application Ser. No. 10/375,205, filed Feb. 27, 2003, entitled, "Methods For Passing A Swelling Agent Into A Reservoir To Block Undesirable Flow Paths During Oil Production," assigned to the assignee of the invention, which is incorporated by reference in its entirety. Like the sealing and/or blocking compositions mentioned in the Background of the Invention, such water-swellable polymers possess the capacity to form gel masses that resist unwanted fluid flow through the formation. The resultant gel masses readily penetrate into fractures of a subterranean formation if the gel masses are of a suitable size. The size of the resultant gel masses depends on the particle size of the dry polymeric material prior to hydration. These properties allow the gelled polymer particles to be packed into the formation voids, forming a seal within the formation.

Unfortunately, the hydrated gel masses of such water-swellable agents exhibit little in the way of cohesive properties, which significantly limits their ability to form substantial, durable, in situ seals. Further, such agents are held against the formation's surface primarily by frictional or interference forces. If sufficient hydrostatic pressure is exerted upon these seals, fluid may pass between the gelled polymer particles and continue to escape into the formation.

It has been discovered that by combining a water-swellable agent together with a sealing agent, a more cohesive gel system can be obtained for treating a subterranean formation. A method of use includes the steps of introducing both a water-swellable agent and a sealing agent through a well into a subterranean formation. Such a well treatment composition is capable of forming a more durable, hydrostatic pressure-resistant seal that substantially reduces or blocks the flow path of fluid through a zone in a subterranean formation.

The term "water-swellable agent" is generally used to refer to an agent that is capable of swelling in the presence of water. As used herein, the term is specifically defined to mean an agent that swells (i.e., expands) as it absorbs water to at least two (2) times its original mass. Preferably, the water-swellable agent: i) absorbs greater than 100 weight % of water; and ii) swells to greater than 100 weight % as it absorbs water. Preferably the sealing agent: i) is greater than 0.01 weight % soluble in water; and ii) forms a three dimensional gel structure in water. Preferably, the water-swellable agent has these properties of absorbing and swelling at standard temperature and pressure. Also, the sealing agent preferably has these properties of solubility at standard temperature and pressure. Without being limited by any theoretical explanation, it is believed that because the water-swellable agent is so insoluble in water, it does not become diluted and washed away by water or other aqueous injectants flowing through the formation.

Examples of water-swellable agents include crosslinked polyacrylamide, crosslinked polyacrylate, copolymers of acrylamide and acrylate monomers, a starch backbone grafted with acrylonitrile and acrylate, polymers of two or more of allylsulfonate, 2-acrylamido-2-methyl-1-propane-sulfonic acid, 3-allyloxy-2-hydroxy-1-propane-sulfonic acid, acrylamide, and acrylic acid monomers, and any combination in any proportion of the foregoing. The water-swellable agent is preferably a crystalline polymer that has been dehydrated. One preferred water-swellable agent is crosslinked polyacrylamide in the form of a hard crystal. Still other examples of water-swellable agents include hydrolyzed polyacrylonitrile, carboxyalkyl cellulose, carboxymethyl starch, salts of carboxymethyl cellulose, carboxyalkyl polysaccharide, and any combination in any proportion of the foregoing. Further water-swellable agents are described in European Patent No. 0566118, filed Apr. 14, 1993, by inventor Jian Qin, which is incorporated herein by reference in its entirety.

Preferably, the water-swellable agent comprises a superabsorbent. Superabsorbents are swellable crosslinked polymers that have the ability to absorb and store at least multiples of their own weight of aqueous liquids by forming a gel. Superabsorbents retain the water that they absorb and typically do not release the water, even under pressure. Examples of superabsorbents are sodium acrylate-based polymers having three dimensional, network-like molecular structures. The polymer chains are formed by the reaction/joining of units of acrylic acid monomer, which have been substantially neutralized with sodium hydroxide (caustic soda). Crosslinking units of acrylic acid monomer form a three-dimensional network, enabling the superabsorbent to absorb water into the spaces in the three-dimensional network, and thus forming a gel and locking up water.

Preferably, as the water-swellable agent absorbs water, its physical size increases by about 10 to 400 times its original size. The amount and rate by which the water-swellable agent increases in size can vary depending upon temperature, grain size, and the ionic strength of the carrier fluid. Because the temperature of a well generally increases from top to bottom, the rate of swelling tends to increase as the water-swellable agent is pumped downhole. The rate of swelling also increases as the grain size of the water-swellable agent decreases and as the ionic strength of the carrier fluid decreases. For example, the size of the crosslinked polyacrylamide polymer in a 14 mm grind size increases by 0% in 20 minutes after contacting water, 150% in 35 minutes after contacting water, and 400% in 45 minutes after contacting water at 80° F. The size of the crosslinked polyacrylamide polymer increases by 0% in 15 minutes after contacting water, 200% in 25 minutes after contacting water, and 400% in 35 minutes after contacting water at 145° F. The mass of the crosslinked polyacrylamide polymer increases by 0% in 45 minutes after contacting 9.2 pounds/gallon (ppg) Brine Water, 25% in 60 minutes after contacting 9.2 ppg Brine Water, and 50% in 75 minutes after contacting 9.2 ppg Brine Water at 80° F. The mass of the crosslinked polyacrylamide polymer increases by 0% in 30 minutes after contacting 9.2 ppg Brine Water, 25% in 45 minutes after contacting 9.2 ppg Brine Water, and 50% in 60 minutes after contacting 9.2 ppg Brine Water at 145° F. Other scientific data regarding swellable polymers is illustrated in application Ser. No. 10/375,203, filed Feb. 27, 2003, which is assigned to the assignee of the present invention, and incorporated herein by reference in its entirety; application Ser. No. 10/375,183, filed Feb. 27, 2003, also assigned to the assignee of the present invention, and incorporated herein by reference in its entirety; and application Ser. No. 10/233,038, also assigned to the assignee of the present invention, and incorporated herein by reference in its entirety.

While downhole, the water-swellable agent begins to absorb the water and swell into a gel mass that is substantially resistant to the flow of fluid, diminishing the flow into/through the fractures, vugs, voids, fissures, and high permeability streaks through which aqueous fluids could otherwise pass unrestricted. The gel mass can withstand a relatively large amount of pressure and thus resists being dislodged from its position during subsequent placement of the sealant The invention provides introducing the sealing agent into the subterranean formation and subsequently introducing the water-swellable agent into the subterranean formation. Alternatively, the water-swellable agent can be introduced into the subterranean formation prior to introducing the sealing agent into the subterranean formation. Still further, the sealing agent and swelling agent can be introduced into the subterranean formation simultaneously. Also, the sealing agent and water-swellable agent can be mixed together prior to introducing the mixture into the subterranean formation. As used herein, the term "sealing agent" is generally used to refer to an agent that is initially capable of being pumped but after a period of time can form a gel that is not pumpable. This term does not necessarily require, however, that the sealing agent form a gel that completely "seals" a porous formation, but after gelling, the agent should at least resist the fluid flow through a porous formation. Preferably, the sealing agent is greater than 0.01 weight % soluble in water, and forms a gel in water.

The sealing agent is a composition of one or more chemical compounds or classes of chemical compounds that can react, for example, by polymerization and/or crosslinking, to form a material that gels with water. Optionally, the sealing agent can include a catalytic agent to promote polymerization and/or crosslinking, or a catalytic agent can be added later, for example, by over flushing the sealing agent with a carrier containing the catalytic agent.

The reaction of the sealing agent can be delayed to allow for pumping the sealing agent through a wellbore and into a subterranean formation. As the temperature of a subterranean formation is elevated, the increase in temperature can also promote polymerization and/or crosslinking. For example, some crosslinking systems are considered to be heat activated.

Examples of sealing agents that are useful for the present invention have been incorporated by reference in the above Background of the Invention.

Without being limited by any theoretical explanation, in the case of crosslinked polyacrylamide in the form of a hard crystal, it is believed that the crosslinked polyacrylamide deflects and surrounds the water molecules during water absorption. In effect, as the crosslinked polyacrylamide absorbs water, the crosslinked polyacrylamide undergoes a change from that of a dehydrated crystal to that of a hydrated gel. In combination with a sealing agent, it is believed that some of the sealant is adsorbed by the crosslinked polyacrylamide (water-swellable agent) within their individual three dimensional lattice structures, and thus when the sealant crosslinks or polymerizes, the newly formed gel is a continuous mass both inside and outside the water-swellable agent, thereby providing a more cohesive gel mass. In addition, it is believed that the sealing agent becomes a more concentrated gel mass, and is better able to "seal" against the formation surface.

It is further believed that the water-swellable crosslinked polyacrylamide becomes more pressure resistant in conjunction with the sealing agent because it acquires a more sticky property. Similarly, the sealing agent becomes more pressure resistant because it acquires the voluminous properties of a water-swellable agent. Because of this synergistic relationship, the water-swellable agent and the sealing agent form a more durable seal in a subterranean formation.

Once fully hydrated, the water-swellable agent and the sealing agent exhibit a high resistance to the migration of aqueous fluids through the gel mass. That is, the polymers of the water-swellable agent and the sealing agent are sufficiently packed together to substantially inhibit water from passing through the gel. Further, the gel can effectively seal fractures in the reservoir because it can withstand substantial amounts of pressure without being dislodged from the formation's surface. The relatively low permeability of water and/or other injectant fluids through the gel-packed formation creates a barrier to the flow of water through the permeable zone in the subterranean formation.

As mentioned, the invention provides for a method of treating a subterranean formation penetrated by a wellbore, the method comprising the steps of: a) introducing a sealing agent into the subterranean formation; and b) introducing a water-swellable agent into the subterranean formation. These steps can be performed simultaneously or separately. For example, the sealing agent and the water-swellable agent can be combined to form a mixture that is then introduced into the subterranean formation.

An aqueous solution can be introduced into the subterranean formation before, along with, or after introducing the sealing agent and/or water-swellable agent into the subterranean formation. As the aqueous fluid contacts the water-swellable agent, the water-swellable agent swells to form a gel mass that substantially plugs one or more of the permeable zones. Preferably, the water-swellable agent is insoluble in water and thus avoids becoming diluted and washed away by aqueous fluids and/or subsequent injectants.

According to some embodiments, the water-swellable agent can be combined with a carrier fluid to form a carrier solution before being placed in a well bore. The carrier fluid can be aqueous or non-aqueous. The carrier fluid can be any suitable fluid that is pumpable for moving the water-swellable agent to desired locations in the reservoir. The water-swellable agent is incorporated in an effective amount to effectively seal a permeable zone upon being placed into the subterranean formation, and the effective amount may vary depending on factors such as the type of the carrier fluid, the size of a fracture, fissure, and the like. The amount of water-swellable agent that may be combined with the carrier fluid depends on a number of factors, including the type of carrier fluid. In general, the carrier fluid may contain from about 0.001 to about 5.0 pounds water-swellable agent /gallon carrier fluid, more preferably from about 0.01 to about 2.0 ppg. Preferably, the carrier fluid containing the water-swellable agent remains sufficiently non-viscous in order to be displaced to the permeable areas of the reservoir. Thus, there is no need to apply higher pressure in an attempt to force the water-swellable agent into the permeable areas that could damage the rock structure surrounding the reservoir. Examples of carrier fluids with which the water-swellable agent may be combined include but are not limited to fresh water, deionized water, brine water of varying salinity, chloride solutions such as calcium dichloride and potassium chloride solutions, hydrocarbons such as produced oil and diesel oil, and synthetic fluids such as ester or polymer based fluids.

The invention can be used in producing wells or injection wells. The amount of oil production may be monitored to determine if more water-swellable agent should be added to the reservoir to block additional permeable areas and thus improve production. If needed, additional water-swellable agent can be introduced into the subterranean formation. This procedure may be repeated until the amount of water-swellable agent is sufficient to achieve the desired amount of production. In one embodiment, the water-swellable agent and sealing agent are introduced into one or more injection wells after termination of the production stage of the primary well. Secondary and/or tertiary flooding operations may also be performed by displacing one or more injectants into an injection well and through the reservoir to drive additional oil from the reservoir to the production wells. The presence of the fluid of the invention in the permeable zones serves to substantially block or seal the flow pathways of the injectants through the permeable zones. The water-swellable agent and sealing agent may be introduced into the reservoir concurrently with, or preferably prior to the displacing injectants. Advantageously, displacing injectants thus do not prematurely pass through the permeable zones to the production wells before having been introduced through areas of the reservoir-containing oil.

When used in injection applications, the injectant can be any suitable fluid for causing movement of oil in the flow direction of the fluids as they pass from an injection well through a reservoir containing the oil to a production well. Examples of suitable injectants include fresh water, brine, and gases such as carbon dioxide. Preferably, an aqueous solution serves as both the carrier fluid and an injectant. The water-swellable agent may be introduced to an injectant stream as it is being pumped into an injection well such that the injectant stream also acts as the carrier fluid for the swelling agent. Because the injectant/carrier fluid is an aqueous solution, no additional step is required to contact the water-swellable agent with an aqueous solution to cause the water-swellable agent to swell. Alternatively, the carrier solution can be a non-aqueous solution such as a hydrocarbon, and the injectant is an aqueous solution. As such, the water-swellable agent is combined with the carrier solution before displacing the resulting mixture through an injection well and into the reservoir. The injectant is then displaced to the reservoir to cause the water-swellable agent to swell and to drive oil from the reservoir to the production wells. Alternatively, the carrier solution is a non-aqueous solution, and the injectant is a gas. After combining the water-swellable agent with the carrier fluid and passing the resulting mixture to the reservoir via an injection well, the aqueous solution is introduced into the injection well so as to contact the swelling agent. Then the injectant is displaced into the injection well to drive oil from the reservoir to the production wells.

If desired, the swollen water-swellable agent may be removed from the reservoir or area of placement after it has been used for its intended purpose. If the water-swellable agent and/or sealing agent are a polymer, the backbone structure of the polymer may be broken down such that it becomes more like a liquid. Any known means may be used to break down or collapse the polymer. For example, the polymer may be contacted with an oxidizer such as sodium hypochlorite (i.e., bleach) to eliminate the polymer from the reservoir, preferably by pumping such compounds down the well bore and contacting the conglomerated, swollen water-swellable agent and sealing agent in situ.

After careful consideration of the specific and exemplary embodiments of the invention described, a person of ordinary skill in the art will appreciate that certain modifications, substitutions and other changes can be made without substantially deviating from the principles of the invention. The detailed description is illustrative, the spirit and scope of the invention being limited only by the appended Claims.

What is claimed is:

1. A method for treating a subterranean formation penetrated by a well bore, the method comprising introducing a sealing agent into the subterranean formation prior to, simultaneously with, or after introducing a water-swellable agent into the subterranean formation, wherein the sealing agent comprises a monomer.

2. The method according to claim 1, wherein the water-swellable agent:
   absorbs greater than 100 weight % of water; and
   swells to greater than 100 weight % as it absorbs water.

3. The method according to claim 2, wherein the sealing agent:
   is greater than 0.01 weight % soluble in water; and
   forms a three dimensional gel structure in water.

4. The method according to claim 1, wherein the sealing agent:
   is greater than 0.01 weight % soluble in water; and
   forms a three dimensional gel structure in water.

5. The method according to claim 1 or 3, wherein the water-swellable agent comprises at least one agent selected from the group consisting of a crosslinked polyacrylamide, a crosslinked polyacrylate, a copolymer of acrylamide and acrylate monomers, a starch backbone grafted with acrylonitrile and acrylate, a polymer of two or more of allylsulfonate, 2-acrylamido-2-methyl-1-propanesulfonic acid, 3-allyloxy-2-hydroxy-1-propane-sulfonic acid, acrylamide, and an acrylic acid monomer, and any combination in any proportion of the foregoing.

6. The method according to claim 1 or 3, wherein the water-swellable agent comprises at least one agent selected from the group consisting of a hydrolyzed polyacrylonitrile, a carboxyalkyl cellulose, a carboxymethyl starch, a salt of carboxymethyl cellulose, a carboxyalkyl polysaccharide, and any combination in any proportion of the foregoing.

7. The method according to claim 5, wherein the crosslinked polyacrylamide comprises a crystalline polymer of crosslinked polyacrylamide.

8. The method according to claim 1 or 3, wherein the monomer comprises a water soluble, hydroxy unsaturated carbonyl monomer.

9. The method according claim 1 or 3, wherein the sealing agent comprises a polymerizable monomer and a crosslinker for the polymerizable monomer.

10. The method according to claim 9, wherein the sealing agent comprises:
   polymerizable water-soluble vinyl monomer;
   multifunctional vinyl monomer capable of polymerizing and crosslinking; and
   a water-soluble azo initiator.

11. The method according to claim 1 or 3, further comprising the step of introducing an aqueous solution before, along with, or after introducing the sealing agent and/or the water-swellable agent into the subterranean formation.

12. The method according to claim 1 or 3, further comprising the step of combining a carrier solution with the water-swellable agent before introducing the water-swellable agent into the subterranean formation.

13. A method for treating a subterranean formation penetrated by a well bore, the method comprising:
   combining a sealing agent and a water-swellable agent to form a mixture, wherein the sealing agent comprises a monomer;
   introducing the mixture into the subterranean formation.

* * * * *